United States Patent
Ketteler et al.

(10) Patent No.: US 9,428,402 B2
(45) Date of Patent: Aug. 30, 2016

(54) METHOD FOR PRODUCING FINELY DIVIDED HAEMATITE AND FOR PRODUCING IRON OXIDE RED PIGMENTS

(71) Applicant: LANXESS Deutschland GmbH, Cologne (DE)

(72) Inventors: Guido Ketteler, Duesseldorf (DE); Udo Holtmann, Leverkusen (DE); Juergen Kischkewitz, Ratingen (DE)

(73) Assignee: LANXESS Deutschland GmbH, Cologne (DE)

( * ) Notice: Subject to any disclaimer, the term of this patent is extended or adjusted under 35 U.S.C. 154(b) by 42 days.

(21) Appl. No.: 14/342,860

(22) PCT Filed: Sep. 28, 2012

(86) PCT No.: PCT/EP2012/069181
§ 371 (c)(1),
(2) Date: Mar. 5, 2014

(87) PCT Pub. No.: WO2013/045608
PCT Pub. Date: Apr. 4, 2013

(65) Prior Publication Data
US 2014/0205664 A1  Jul. 24, 2014

(30) Foreign Application Priority Data

Sep. 30, 2011  (EP) .................................. 11183605

(51) Int. Cl.
*C09C 1/22* (2006.01)
*C09C 1/24* (2006.01)
*C01G 49/00* (2006.01)
*C01G 49/06* (2006.01)
*B82Y 30/00* (2011.01)

(52) U.S. Cl.
CPC .............. *C01G 49/06* (2013.01); *B82Y 30/00* (2013.01); *C09C 1/24* (2013.01); *C01P 2004/64* (2013.01); *C01P 2006/12* (2013.01); *C01P 2006/80* (2013.01); *Y10T 428/2982* (2015.01)

(58) Field of Classification Search
CPC .................................. C09C 1/20; C01G 49/06
See application file for complete search history.

(56) References Cited

U.S. PATENT DOCUMENTS

| | | | |
|---|---|---|---|
| 1,327,061 A | 1/1920 | Penniman, Jr. et al. | |
| 1,368,748 A | 2/1921 | Penniman, Jr. et al. | |
| 2,937,927 A | 5/1960 | Ayers | |
| 5,004,504 A | 4/1991 | Schroeder et al. | |
| 5,421,878 A | 6/1995 | Lerch et al. | |
| 5,614,012 A | 3/1997 | Pltzer | |
| 6,503,315 B1 * | 1/2003 | Etzenbach | C01G 49/06 106/456 |
| 6,616,747 B2 | 9/2003 | Sumita | |
| 8,206,681 B2 | 6/2012 | Garetto | |
| 2003/0051636 A1 * | 3/2003 | Sumita | B82Y 30/00 106/456 |
| 2008/0181843 A1 | 7/2008 | Lu et al. | |

FOREIGN PATENT DOCUMENTS

| | | | |
|---|---|---|---|
| EP | 0645437 A1 | 3/1995 | |
| JP | 35-1224 | * | 2/1960 |

OTHER PUBLICATIONS

Shen Qing, et al. "Preparation of Iron Oxide Red Crystal Seed by Nitric Acid Process, and Influence of the Same on Oxidation", 1997, Inorganic Chemicals Industry, Zibo Cobalt Industrial Co., Ltd. Zibo, China, 255200 pp. 1-6.
European Search Report from European Application No. 11183605, dated Mar. 30, 2012, two pages.

* cited by examiner

*Primary Examiner* — Pegah Parvini

(57) ABSTRACT

The present invention relates to an improved process for the production of finely divided haematite and of iron oxide red pigments made up of the finely divided haematite and the use of the finely divided haematites and iron oxide red pigments produced by this process.

20 Claims, No Drawings

METHOD FOR PRODUCING FINELY DIVIDED HAEMATITE AND FOR PRODUCING IRON OXIDE RED PIGMENTS

The present invention relates to an improved process for the production of finely divided haematite and of iron oxide red pigments made up of the finely divided haematite and the use of the finely divided haematites and iron oxide red pigments produced by this process.

Iron oxides are employed in many industrial fields. Thus, for example, they are used as colour pigments in ceramics, building materials, plastics, surface coatings and paper, serve as bases for various catalysts or support materials and can adsorb or absorb pollutants. Magnetic iron oxides are employed in magnetic memory media, toners, ferrofluids or in medical applications, for example as contrast agents for magnetic resonance tomography.

In many of these applications, the particle size of the iron oxide particles plays a critical role. Particles which have a particle size less than or equal to 100 nm are required for applications in which the technical effect is determined by the surface of the particles. Iron oxides having a particle size of less than or equal to 100 nm are for the purposes of the present invention referred to as finely divided iron oxides or finely divided iron oxide particles, or when the iron oxide is haematite, as finely divided haematites. These are used, for example, for catalytic applications or in the fields of adsorption or absorption or sensors. Super paramagnetic or soft magnetic materials are used, for example, in medical applications. Transparent pigments whose particle size is smaller than the wavelength of visible light give the impression of being transparent, which is determined first and foremost by the absorption, because of the low scattering of light.

In all these examples of applications, the production of a defined particle size is of critical importance. However, the production of high-quality, finely divided iron oxide having a defined particle size on an industrial scale is complicated.

There are a number of methods of producing finely divided iron oxide and these can be divided into essentially the following groups:
1. Mechanical methods
2. Gas-phase methods
3. Liquid-phase methods As will be shown below, all existing methods are associated with the disadvantages that the production process is either very complicated and energy-intensive, that the by-products have to be separated off in a complicated manner, that the materials and raw materials to be used have to meet demanding requirements in respect of their composition, that the finely divided iron oxide obtained cannot be obtained in high purity and/or that the products can only be obtained at a low conversion. There is therefore still a need to provide a simple, economical, aqueous process which does not rely on a specific raw materials quality and nevertheless provides high-purity, finely divided iron oxide, especially finely divided iron oxide in the haematite modification. This is used, for example, in pigment formation processes for producing iron oxide red pigments.

Finely divided iron oxide is difficult to obtain by mechanical methods (milling) and contamination by abrasion of the milling element frequently occurs. Finely divided iron oxide, especially finely divided iron oxide in the haematite modification, has a high surface energy and the energy which has to be employed for comminution into finely divided primary particles therefore increases with decreasing particle size and mechanical production methods for finely divided particles are therefore very energy-intensive and not well suited.

Gas-phase methods include chemical vapour deposition, laser ablation deposition, sputtering techniques or ignition at high temperatures. For this purpose, another finely divided iron oxide is used and ignited, generally using ignition conditions under which a finely divided haematite is also obtained [e.g. U.S. Pat. Nos. 5,004,504, 5,614,012]. These particles can be produced on an industrial scale and are used as transparent pigments. These methods generally employ high temperatures, as a result of which hard aggregates can form and these require a subsequent mechanical treatment and can be broken up into the finely divided primary particles only with difficulty and with a high consumption of energy.

However, very finely divided iron oxide particles can be obtained very readily at moderate temperatures by thermal decomposition of iron carbonyl or Fe-organic precursor compounds [A. Shavel, L.M. Liz-Marzán, Phys. Chem. Chem. Phys. 11 (2009), 3762.]. These syntheses have the disadvantage that the metal-organic compounds used are not available in large amounts, are expensive and that the organic by-products of the reaction require complicated removal.

The synthesis in the liquid phase is generally significantly better suited for the production of finely divided iron oxide. This includes a number of methods such as precipitation and hydrolysis reactions, hydrothermal and solvothermal syntheses, sol-gel processes and microemulsion methods.

For production in the liquid phase, a distinction can be made between syntheses in aqueous and nonaqueous liquids. Syntheses in the nonaqueous phase have the great disadvantage that the nonaqueous solvents require complicated removal and purification of the wastewater and because of their flammability generally place considerable demands on occupational hygiene. It is desirable to develop a robust, purely aqueous method which does not place demanding requirements on the raw materials used.

Iron oxides can be obtained by aqueous precipitation and hydrolysis reactions of iron salts (Ullmann's Encyclopedia of Industrial Chemistry, VCH Weinheim 2006, Chapter 3.1.1. Iron Oxide Pigments, pp. 61-67). Iron oxide pigments via the precipitation process are produced from iron salt solutions and alkaline compounds in the presence of air. Targeted control of the reaction also makes it possible to prepare finely divided goethite, magnetite and maghaemite particles in this way.

However, the aqueous production of finely divided haematite, which corresponds to the modification $\alpha$-$Fe_2O_3$, is significantly more complicated. Use of a ripening step also makes it possible to produce haematite by direct aqueous precipitation with addition of a finely divided iron oxide in the maghaemite modification, $\gamma$-$Fe_2O_3$, or lepidocrocite modification, $\gamma$-FeOOH, as nucleus [U.S. Pat. No. 5,421,878; EP 0645437, WO 2009/100767], but finely divided haematite within the meaning of the present invention, i.e. having a particle size of less than or equal to 100 nm, cannot be obtained in this way.

A further method of producing iron oxide red pigments is the Penniman process (U.S. Pat. Nos. 1,327,061; 1,368,748; 2,937,927, EP 1106577A, U.S. Pat. No. 6,503,315). Here, iron oxide pigments are produced by dissolution and oxidation of iron metal with addition of an iron oxide nucleus. Thus, SHEN, Qing; SUN, Fengzhi; Wujiyan Gongye 1997, (6), 5-6 (CH), Wujiyan Gongye Bianjib, (CA 128:218378n) have disclosed a process in which dilute nitric acid acts on metallic iron at elevated temperature. This forms a haematite nucleus suspension. This is built up in a manner known per se to form a suspension of red pigment and the pigment is, if desired, isolated from this suspension in a conventional way. However, the red pigments produced by this process have a comparatively low colour saturation which is similar to the colour saturation of a commercial 130 standard and are therefore used predominantly in the building materials industry. EP 1106577A discloses a variant of the Penniman process which comprises action of dilute nitric acid on metallic iron at elevated temperature to produce nuclei, i.e. finely divided iron oxides having a particle size of less than or equal to 100 nm. The reaction of metallic iron with nitric acid is a complex reaction and can, depending on the experimental conditions, lead either to passivation of the iron and thus cessation of the reaction or to dissolution of the iron to form dissolved iron nitrate. Both reaction paths are undesirable and the production of finely divided haematite succeeds only under restricted experimental conditions. EP 1106577A describes such experimental conditions for producing finely divided haematite. Here, the metallic iron is reacted with dilute nitric acid at temperatures in the range from 90 to 99° C. It has now been found that this production method requires good mechanical mixing of the reaction mixture since only under these conditions only low conversions at long reaction times can be achieved without mechanical mixing of the reactants. To ensure good mechanical mixing, a complicated reactor design is necessary. In addition, under these reaction conditions the conversions of iron relative to the nitric acid used fluctuate, i.e. the process does not proceed in a stable manner. It has been found that under these conditions the quality of the iron used also has an influence on the conversions of iron relative to the nitric acid used and makes the course of the reaction less foreseeable and less reliable from reaction to reaction.

It was an object of the invention to provide a robust, stable and economical, aqueous process for producing finely divided haematite, which gives, with a high conversion, high-purity, finely divided haematite from which highly chemically pure, bright and intensely coloured iron oxide red pigments can be produced in a downstream pigment formation process.

We have now found that this complex object is achieved by a process for the production of finely divided haematite having a particle size of less than or equal to 100 nm and a specific BET surface area of from 40 m$^2$/g to 150 m$^2$/g, measured in accordance with DIN 66131, which comprises at least the steps
  a) provision of a mixture of metallic iron and water having a temperature of from 60 to 120° C.,
  b) addition of dilute nitric acid to the mixture from step a),
  c) separation of the aqueous suspension of finely divided haematite from any unreacted, metallic iron,
  d) optionally isolation of the finely divided haematite from the aqueous suspension which has been separated off.

The criterion of the particle size is preferably considered to be satisfied when 90% of the particles have a particle size of less than or equal to 100 nm, particularly preferably from 30 nm to 90 nm.

In step b), the addition of dilute nitric acid is preferably carried out at such a rate of addition to the mixture from step a) that the reaction mixture heats up by at least 15° C. within less than 120 minutes after the addition of nitric acid is complete, preferably even without supply of external heat. Preference is likewise given to the reaction mixture reaching a maximum temperature of from 105 to 160° C. in step b).

Preference is likewise given to steps a) and b) being carried out in a closed, pressure-tight vessel. Preference is likewise given to awaiting a decrease in the reaction temperature to less than 100° C. after the addition of the dilute nitric acid in step b) is complete before carrying out step c).

The invention encompasses any conceivable combination of the various defined process and materials parameters and their preferred ranges.

The process of the invention for the production of finely divided haematite, wherein the finely divided haematite has a particle size of less than or equal to 100 nm and a specific BET surface area of from 40 m$^2$/g to 150 m$^2$/g, preferably from 60 m$^2$/g to 120 m$^2$/g, measured in accordance with DIN 66131, particularly preferably comprises the steps
  a) heating of a mixture of metallic iron and water to from 60 to 120° C., preferably from 75 to 120° C., in a closed, pressure-tight vessel,
  b) addition of dilute nitric acid to the mixture from step a) at such a rate of addition that the reaction mixture heats up by at least 15° C., preferably by more than 20° C., particularly preferably more than 30° C., within less than 120 minutes, preferably less than 90 minutes, after the addition of nitric acid is complete and the reaction mixture reaches a maximum temperature of from 105 to 160° C., preferably from 120 to 160° C., even without supply of external heat,
  c) awaiting of a decrease in the reaction temperature to less than 100° C.,
  d) separation of the aqueous suspension of finely divided haematite from the metallic iron and
  e) optionally isolation of the finely divided haematite from the aqueous suspension which has been separated off.

It has additionally been found that the procedure according to the invention makes significantly higher conversions of the metallic iron used possible. Based on the starting materials iron and nitric acid, it is desirable to achieve a very high conversion of iron to finely divided haematite relative to the nitric acid used. This leads to a significantly more environmentally friendly process since less raw material ($HNO_3$) is consumed and smaller amounts of harmful by-products in the form of ammonium nitrate ($NH_4NO_3$) and nitrogen oxides (NOx) are formed. The ratio of reacted iron (calculated in mol) per nitric acid used (calculated in mol) serves as index for the conversion. This index will, for the purposes of the present invention, be referred to as molar conversion factor. The process of the invention makes it possible to achieve molar conversion factors of more than 1.3, i.e. more than 1.3 mol of iron are converted into finely divided haematite per mole of $HNO_3$ used. The determination of this molar conversion factor is described in the section on methods. This high molar conversion factor is also achieved with a higher reliability than in processes of the prior art. In addition, these high molar conversion factors are also achieved using different iron grades as raw material, The process of the invention is described in more detail below.

In step a) of this process, metallic iron and water are firstly placed in a reactor, preferably in an acid-resistant and pressure-rated reactor, and heated to a temperature of from 60 to 120° C., preferably from 75 to 120° C., very particularly preferably from 75 to 05° C. The reactor is closed during heating, so that pressures of greater than 1000 hPa [1 bar] can occur within the reactor. In general, the pressure within the reactor is limited by safety measures (e.g. an overpressure valve) to a technically manageable pressure. Typical pressures which occur in the process are, for example, from 0.2 to 1 MPa.

As metallic iron, use is usually made of iron scrap in the form of wire, sheets, nails or coarse turnings. The individual parts are of any shape and usually have a thickness (e.g. measured as diameter of a wire or thickness of a sheet) of from about 0.1 millimetre to about 3 millimetres. The size of wire bundles or of sheets which are used in the process is usually determined by practicality aspects. Thus, the pressure-tight vessel has to be able to be filled with this starting material without difficulty, which is generally effected through a manhole.

The metallic iron used in the process of the invention generally has an iron content of >90%. Foreign metals such as manganese, chromium, silicon, nickel, copper and other elements usually occur as impurities in this iron scrap. However, it is also possible to use metallic iron having a higher purity without disadvantages. On the other hand, iron powders, for example, are not well suited for this process because, owing to the high surface area, they have an excessive reactivity and could lead to vigorous reactions. For the purposes of the present invention, metallic iron is also referred to as elemental iron.

The provision of the mixture according to step a) is preferably effected by heating a mixture of metallic iron and water. After heating, dilute nitric acid is preferably added to the preheated mixture of metallic iron and water at a high addition rate in step b), preferably in a closed, pressure-tight reactor. Mechanical mixing of the reactants (e.g. by stirring or pumped circulation) is not necessary. The process of the invention is preferably carried out without mechanical mixing of the reactants.

The dilute nitric acid used in step b) of the process of the invention preferably has concentrations of from 10 to 67% by weight of $HNO_3$, preferably in the range from 20 to 67% by weight of $HNO_3$. A further acid, e.g. hydrochloric acid or sulphuric acid, can also be used in addition to the nitric acid. Preference is given to using no further acid in addition to the dilute nitric acid in this process step. This brings about the advantage that the finely divided iron oxide which can be obtained by the process of the invention has a very low sulphur and chlorine content. This is advantageous for use in catalysts since sulphur and chlorine represent known catalyst poisons for some reactions. The nitric acid is added to the iron scrap initially charged in the water and is diluted by the initially charged water. The calculated concentration of added $HNO_3$ which would be established without a further chemical reaction in this mixture is preferably from 2 to 15% by weight. When the calculated $HNO_3$ concentration is below 2% by weight, sufficient conversion into haematite particles does not occur.

In general, from >1.33 to 16 mol of iron, preferably from 1.5 to 4 mol, per mole of $HNO_3$ is initially charged in step a). An amount of from >1.33 mol to 1.8 mol of Fe per mole of $HNO_3$ (depending on the molar conversion factor achieved) means a substoichiometric amount of $HNO_3$ in the process of the invention. In this case, metallic iron typically remains after complete reaction of the $HNO_3$. After the suspension of the finely divided haematite has been separated off, the metallic iron remaining in the reaction vessel can be reused in the next reaction. The metallic iron remaining in the reaction vessel can also be used together with fresh iron in the next reaction, so that complete reaction of the raw materials used occurs over a number of batches in a mode of operation using a substoichiometric amount of nitric acid, i.e. an excess of iron, and the aqueous phase of the suspension of the finely divided haematite does not contain any remaining unconsumed nitric acid which has to be neutralized or disposed of in a costly fashion or could lead to undesirable reactions in subsequent batches.

The rate of addition of the nitric acid in step b) is selected so that a temperature increase of at least 15° C., preferably 20° C., very particularly preferably about 30° C., occurs as a result of the exothermic reaction of the nitric acid with the metallic iron and so that a maximum temperature of from 105° C. to 160° C., preferably from 120 to 160° C., is reached in the reaction mixture during the course of the reaction. Step b) of the process of the invention is preferably carried out without supply of external heat. This maximum temperature or highest temperature should preferably be reached within less than 120 minutes, particularly preferably within less than 90 minutes, after the addition of nitric acid is complete. Here, the pressure in the reactor, preferably in the closed, pressure-tight reactor, rises to above 0.1 MPa [1 bar], preferably to from 0.11 to 1 MPa [from 1.1 to 10 bar]. During this reaction, nitrogen oxides, inter alia, are formed as by-product. It is not possible to state an absolute addition rate in "x ml of $HNO_3$/litre of batch volume" in this reaction since the temperature increase in the reaction mixture, during and after the addition of nitric acid alongside the addition rate in "x ml of $HNO_3$/litre of batch volume", depends on various parameters such as the batch size, the thermal insulation of the reaction vessel or the type of metallic iron used. The greater the batch size, the lower the $HNO_3$ addition rate required in order to bring the reaction mixture to the temperature range required according to the claims. The greater the thermal insulation of the reaction vessel, the lower the $HNO_3$ addition rate required to bring the reaction mixture to the temperature range required according to the claims. It is not an absolute addition rate in a particular range but rather the temperature increase in the reaction mixture to the values specified in the claims as a result of the exothermic reaction of the nitric acid with the metallic iron, i.e. without supply of external heat, which is relevant for the high conversion factor achieved in the process of the invention. A person skilled in the art will determine the $HNO_3$ addition rate necessary to achieve the temperature rise required according to the claims in the respective reaction vessel by means of preliminary tests.

It is known that high nitric acid concentrations can bring about passivation of the iron scrap. However, the rapid increase in the concentration of $HNO_3$ in the process of the invention due to the high addition rate surprisingly does not bring about any passivation of the iron but instead the technical advantage that the reaction of the metallic iron with the nitric acid proceeds significantly faster and more completely but nevertheless in a controllable manner and nevertheless leads to high-purity finely divided haematite. In this way, the molar conversion factor in the process of the invention increases to a value in the range from 1.3 to 1.8. The calculated molar conversion factors for the two known stoichiometric reactions according to

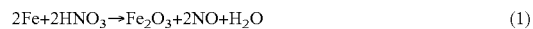  (1)

  (2)

are 1.0 (reaction equation 1) and 1.33 (reaction equation 2). Accordingly, other reactions also have to take place at the relatively high conversion factors achieved in the process of the invention. The molar conversion factors achieved by the process disclosed in EP 1106577A are, according to our studies, less than 1.3, sometimes less than 1.0. In addition, the reaction times there are longer and the space-time yields are therefore lower. Accordingly, the conversion of the iron probably proceeds according to the reaction equations (1) and/or (2) in this process. Since amounts of iron of from two- to four-figure kg amounts are used per batch in the production of iron oxides on the industrial scale, the combination of the higher conversion factors achieved with the higher space-time yields and the increased process stability represents a significant advantage over the processes of the prior art.

When the nitric acid concentration drops as a result of the reaction of the nitric acid with the metallic iron in the process of the invention, the temperature and the pressure within the reactor, preferably the closed, pressure-tight reactor, also drop. The reaction is continued until the reaction temperature has decreased to less than 100° C. Since the reaction is largely finished after the maximum temperature has been reached, the reactor can also be cooled by means of external measures, e.g. cooling, to a temperature of less than 100° C.

After the reaction is complete, the finely divided haematite is present in aqueous suspension and can either be used as suspension in further processes or be washed and/or isolated as a solid by sedimentation, filtration or centrifugation.

The invention also provides the finely divided haematite obtained by the process of the invention. The finely divided haematite produced in this way either consists of more than 99% by weight of $\alpha\text{-}Fe_2O_3$ or can optionally also contain proportions of FeOOH, e.g. of crystalline $\alpha$-FeOOH (goethite), in amounts of up to 5% by weight, preferably less than 1% by weight. The finely divided haematite produced by the process of the invention has a specific BET surface area of from 40 $m^2/g$ to 150 $m^2/g$, preferably from 60 $m^2/g$ to 120 $m^2/g$ (measured in accordance with DIN 66131). The haematite produced by the process of the invention has a round, oval or hexagonal particle shape and has a particle size in the range from 20 to 100 nm. The finely divided haematite has a high purity, even when iron having relatively high foreign metal contents is used as raw material. Foreign metals present in iron scrap are generally manganese, chromium, aluminium, copper, nickel, cobalt and/or titanium in various concentrations, and these can also be precipitated as oxides or oxyhydroxides on reaction with nitric acid and be incorporated into the finely divided haematite, with the degrees of incorporation being very different. In the process of the invention, manganese, for example, is incorporated into the haematite with a degree of incorporation of 0.5% or less, i.e. based on the iron scrap reacted, 0.5% or less of the manganese present in the iron scrap is incorporated into the pigment. When, for example, metallic iron having a manganese content of 1000 ppm is used as raw material, the finely divided haematite obtained by the process of the invention contains, at a degree of incorporation of 0.5%, only 5 ppm of Mn, based on the iron present in the pigment.

The high-purity finely divided haematite produced by the process of the invention offers the following advantage for a number of industrial applications: it makes growth of particularly pure and well crystallized pigments which therefore have a particularly intense colour and brilliance possible. High-purity, finely divided haematite having a high surface area is suitable for industrial applications in which purity plays an important role, e.g. in accumulators, batteries, medical applications, as sensor and is of great industrial importance for catalysts since many impurities act, even in small amounts, as catalyst poison.

The invention also provides a process for the production of iron oxide red pigments, in which the above-described finely divided haematite is used as nucleus.

This process for the production of iron oxide red pigments comprises the steps
 i. production of an aqueous suspension of finely divided haematite by the inventive process disclosed above,
 ii. reaction of the aqueous suspension of finely divided haematite as nucleus with an iron salt, an alkaline precipitate in the presence of oxygen-containing gases or by reaction of elemental iron, an iron salt and oxygen-containing gases to give a haematite pigment suspension and
 iii. optionally isolation of the pigment present in the suspension or else not.

Iron salts used are, for example, iron(II) sulphate, iron(II) nitrate, iron(III) nitrate or iron(II) chloride. Preference is given to using iron(II) nitrate and iron(II) sulphate, particularly preferably iron(II) nitrate.

The iron salts are usually used in the form of their aqueous solutions.

As alkaline precipitants, it is possible to use, for example, NaOH, KOH, $Na_2CO_3$, $K_2CO_3$, $NH_3$ or $NH_4OH$ or other alkali metal and/or alkaline earth metal hydroxides and carbonates. Preference is given to using alkali metal hydroxides or alkali metal carbonates, particularly preferably NaOH.

The oxygen-containing gases used in the process of the invention can be, for example, air, oxygen, $NO_2$, $O_3$ or mixtures of the gases mentioned. Preference is given to air.

The isolation of the pigment present in the suspension is carried out by filtration and/or sedimentation and drying.

In preferred embodiments, the process for producing iron oxide red pigments is carried out as described above, with the following additional provisions
 the reaction of the aqueous suspension of finely divided haematite as nucleus with an iron salt is carried out in the presence of metallic iron at temperatures in the range from 70 to 100° C., and/or
 an aqueous iron(II) nitrate solution and optionally an aqueous iron(II) sulphate solution is used as iron salt, and/or
 the aqueous suspension of finely divided haematite is used in a concentration of from 1 to 50 g/l based on the volume of the reaction mixture at the beginning of the reaction, preferably from 5 to 40 g/l based on the volume of the reaction mixture at the beginning of the reactor, and/or
 metallic iron is used in a concentration of from 20 to 100 g/l based on the volume of the reaction mixture at the beginning of the reaction and/or
 an oxygen-containing gas, preferably air, is introduced into the reaction mixture in an amount of from 1 to 30 litres per hour and litres of reaction volume for a time of from 2 to 150 hours during heating up to the reaction temperature and/or during the reaction.

Here, the concentration of the iron(II) nitrate solution is generally at by means of a more highly concentrated aqueous iron(II) nitrate solution so that it is in the range from 5 to 100 g/l, preferably from 5 to 60 g/l, based on the volume of the reaction mixture at the beginning of the reaction.

The invention also provides the iron oxide red pigment obtained by the process of the invention in its various embodiments. These pigments are pigments having a high colour purity and colour intensity as are also obtained by the process according to EP 1106577A. The red pigments produced by the process of the invention also display a colour saturation (C*) of greater than 39 CIELAB units in colour testing.

The invention also provides for the use of the finely divided haematite produced by the process of the invention and of the iron oxide red pigment produced by the process of the invention for the colouring of products of the paint, varnish, coatings, building material, plastics or paper industry, of foodstuffs, baking enamels or coil coating compositions, granulated sands, sand-lime bricks, enamels, ceramic glazes, asphalt or bark mulch or of products of the pharmaceutical industry, preferably of tablets, or use as adsorbent, sensor, catalyst or the use as component in batteries or accumulators, electrodes or the use as raw material for producing other iron oxides or iron chemicals.

The invention additionally provides a process for the colouring of products of the paint, varnish, coatings, building material, plastics or paper industry, of foodstuffs, baking enamels or coil coating compositions, granulated sands, sand-lime bricks, enamels, ceramic glazes, asphalt or bark mulch or of products of the pharmaceutical industry, preferably of tablets, using the finely divided haematite produced by the process of the invention or the iron oxide red pigment produced by the process of the invention, with colouring being carried out by methods known per se.

EXAMPLES AND METHODS

I. Description of the Measurement and Test Methods Used
I.1 The Specific BET Surface Area was Measured in Accordance with DIN 66131.
I.2 Molar Conversion Factor The molar conversion factor, which indicates the number of moles of iron reacted per mole of nitric acid used, is determined by weighing the iron used in the reaction in the dry state before commencement of the reaction and weighing the iron which remains in the reactor after the reaction. For this purpose, the moist iron is rinsed free of pigment residues after the reaction, dried at 80° C. for 24 hours and weighed after cooling. The difference between the iron scrap used and the dried iron scrap remaining after the reaction is converted into "mol of Fe" and the absolute value of "mol of Fe" is divided by the absolute value of "mol of $HNO_3$" (based on the amount of $HNO_3$ used), giving the molar conversion factor.
I.3 Manganese Content The sample is admixed with acid and dissolved in a microwave oven until the sample has been completely dissolved. The manganese content is subsequently measured by optical emission spectrometry using inductively coupled plasma (ICP-OES). Other foreign metal contents can also be measured by this method.
II. Examples Example 1

8.44 kg (151.1 mol) of iron punching sheets (thickness 0.8 mm) are placed in 61.3 kg of water and heated to 80° C., 18.67 kg of 30% strength by weight nitric acid (88.9 mol) are added over a period of 10 minutes at an addition rate of 1851 g/min. The amount of nitric acid added corresponds to a calculated initial concentration of 7% by weight in the reaction mixture. The temperature of the reaction mixture rises over a period of 20 minutes after the end of the nitric acid addition to a maximum of 151° C. and the pressure rises and is limited to 4.3 bar. A suspension of haematite is formed and 12.06 kg of finely divided haematite are obtained from this after filtration and drying of the residue. The haematite obtained in this way has a BET surface area determined in accordance with DIN 66131 of 48 $m^2$/g. The molar conversion factor of metallic iron based on the nitric acid used is 1.7.

Example 2

5.42 kg (97.1 mol) of iron wire pins (nails) are placed in 68.2 kg of water and heated to 80° C. 11.84 kg of 30.4% strength by weight nitric acid (57.1 mol) are added over a period of 10 minutes at an addition rate of 1174 g/min. The amount of nitric acid added corresponds to a calculated initial concentration of 4.5% by weight in the reaction mixture. The temperature of the reaction mixture rises over a period of 60 minutes after the end of the nitric acid addition to a maximum of 125° C. and the pressure rises and is limited to 4.5 bar. A suspension of haematite is formed and 6.54 kg of finely divided haematite are obtained from this after filtration and drying of the residue. The haematite obtained in this way has a BET surface area determined in accordance with DIN 66131 of 73 $m^2$/g. The molar conversion factor of metallic iron based on the nitric acid used is 1.43.

Example 3

8.44 kg (151.1 mol) of iron wire pins (nails) are placed in 61.3 kg of water and heated to 95° C. 18.67 kg of 30% strength by weight nitric acid (88.9 mol) are added over a period of 10 minutes at an addition rate of 1851 g/min. The amount of nitric acid added corresponds to a calculated initial concentration of 7% by weight in the reaction mixture. The temperature of the reaction mixture rises over a period of 30 minutes after the end of the nitric acid addition to a maximum of 143° C. and the pressure rises and is limited to 3.4 bar. A suspension of haematite is formed and 10.67 kg of finely divided haematite are obtained from this after filtration and drying of the residue. The haematite obtained in this way has a BET surface area determined in accordance with DIN 66131 of 51 $m^2$/g. The molar conversion factor of metallic iron based on the nitric acid used is 1.5.

Particle size: The finely divided haematites produced according to the invention have a particle size of less than or equal to 100 nm. 90% of the particles of the finely divided haematites produced according to the invention have a particle size of from 30 to 90 nm. The particle size is determined by electron microscopy.

Comparative Example 4

5.42 kg (97.1 mol) of iron wire pins (nails) are placed in 68.2 kg of water and heated to 80° C. 11.84 kg of 30.4% strength by weight nitric acid (57.1 mol) are added over a period of 59 minutes at an addition rate of 200 g/min. The amount of nitric acid added corresponds to a calculated initial concentration of 4.5% by weight in the reaction mixture. The temperature of the reaction mixture rises over a period of 140 minutes after the end of the nitric acid addition to a maximum of 91° C. and the pressure rises and is limited to 4 bar. A suspension of haematite is formed and 4.38 kg of finely divided haematite are obtained from this after filtration and drying of the residue. The haematite obtained in this way has a BET surface area determined in accordance with DIN 66131 of 131 m²/g. The molar conversion factor of metallic iron based on the nitric acid used is 0.96.

Comparative Example 5

3198 (5.71 mol) of iron punching sheets (thickness 1.6 mm) are placed in 3.2 kg of water and heated to 95° C. 803 g of 29.9% strength by weight nitric acid (3.81 mol) are added over a period of 80 minutes at an addition rate of 10 g/min. The amount of nitric acid added corresponds to a calculated initial concentration of 6% by weight in the reaction mixture. The temperature of the reaction mixture rises over a period of 1 minute after the end of the nitric acid addition to a maximum of 99° C. and the pressure rises and is limited to 4 bar. A suspension of haematite is formed and 320 g of finely divided haematite are obtained from this after filtration and drying of the residue. The haematite obtained in this way has a BET surface area determined in accordance with DIN 66131 of 83 m²/g. The molar conversion factor of metallic iron based on the nitric acid used is 1.22.

Comparative Example 6

5.42 kg (97.1 mol) of iron punching sheets (thickness 2 mm) are placed in 68 kg of water and heated to 80° C. 12 kg of 30% strength by weight nitric acid (57.1 mol) are added over a period of 10 minutes at an addition rate of 1190 g/min. The amount of nitric acid added corresponds to a calculated initial concentration of 4.5% by weight in the reaction mixture. The temperature of the reaction mixture rises over a period of 10 minutes after the end of the nitric acid addition to a maximum of 83° C. A suspension of haematite is formed and 3.9 kg of finely divided haematite are obtained from this after filtration and drying of the residue. The haematite obtained in this way has a BET surface area determined in accordance with DIN 66131 of 166 m²/g. The molar conversion factor of metallic iron based on the nitric acid used is 0.86.

Example 7

Iron Oxide Red Pigment 367 g of iron, 0.66 mol of the suspension of the finely divided haematite from Example 1 (corresponding to 15 g/l based on the reaction volume at the beginning of the reaction), 1.56 mol of Fe(NO$_3$)$_2$ (40 g/l based on the reaction volume at the beginning of the reaction) are placed in a reaction vessel and made up to a volume of 7 l with water. The reaction mixture is heated to 85° C. and built up over 72 hours with introduction of 52.5 l/h of air. The pigment is filtered off, washed to a conductivity of less than 2 mS and dried at 80° C. in a drying oven. A haematite red pigment was formed.

What is claimed is:

1. A process for the production of finely divided haematit having a particle size of less than or equal to 100 nm and a specific BET surface area of 40 m²/g to 150 m²/g, measured in accordance with DIN 66131, the process comprising:
   a) adding dilute nitric acid to a mixture of metallic iron and water at a temperature of 60 to 120° C. to produce a reaction mixture, wherein the dilute nitric acid is added at a rate sufficient to raise the temperature of the reaction mixture to a temperature of 105 to 160° C., producing an aqueous suspension of finely divided haematite, and
   b) separating the aqueous suspension of finely divided haematite from any unreacted, metallic iron.

2. The process according to claim 1, wherein the dilute nitric acid is added at a rate of addition sufficient to raise the temperature of the reaction mixture by at least 15° C. within less than 120 minutes after the addition of nitric acid is complete.

3. The process according to claim 1, further comprising isolating the finely divided haematite from the aqueous suspension.

4. A process for the production of finely divided haematite having a particle size of less than or equal to 100 nm and a specific BET surface area of 40 m²/g to 150 m²/g, measured in accordance with DIN 66131, the process comprising:
   a) heating a mixture of metallic iron and water to a temperature of 60 to 120° C. in a closed, pressure-tight vessel to produce a heated mixture,
   b) adding dilute nitric acid to the heated mixture of step a) to produce a reaction mixture, wherein the dilute nitric acid is added at a rate of addition sufficient to raise the temperature of the reaction mixture by at least 15° C. within less than 120 minutes after the addition of nitric acid is complete, and reacting the nitric acid and metallic iron with a corresponding pressure increase in the vessel to a pressure greater than atmospheric pressure, wherein the reaction mixture reaches a temperature of 105 to 160° C. without supply of external heat, and whereby an aqueous suspension of finely divided haematite is produced, and
   c) separating the aqueous suspension of finely divided haematite from the metallic iron.

5. The process according to claim 1, wherein the finely divided haematite has a particle size of 20 to 100 nm.

6. The process according to claim 4, wherein the heating of a mixture of metallic iron and water in step a) comprises heating to 75 to 120° C.

7. The process according to claim 4, wherein the pressure in the closed vessel rises to 0.2 to 1 MPa in step b).

8. The process according to claim 1, wherein a mol ratio of Fe to HNO$_3$ is from 1.33:1 to 16:1.

9. The process according to claim 1, wherein a mol ratio of Fe to HNO$_3$ is from 1.5 to 4.

10. The process according to claim 1, wherein a mol ratio of Fe to HNO$_3$ is from 1.33 to 1.8.

11. The process according to claim 1, wherein the dilute nitric acid has a concentration of 10 to 67% by weight of HNO.

12. The process according to claim 1, wherein:
   the finely divided haematite has a particle size of 30 to 90 nm and a BET surface area of 60 m² to 120 m²/g;
   the metallic iron and water in step a) is heated to 75 to 95° C.;
   adding the dilute nitric acid comprises adding 2 to 15 wt % of HNO$_3$ based on the weight of the reaction mixture wherein the dilute nitric acid has a concentration of 20 to 67% by weight of HNO$_3$;
   the reaction mixture is contained in a closed pressure vessel and reaches a temperature of 120 to 160° C., and a pressure of 0.2 to 1 MPa;
   the dilute nitric acid is added a rate of addition sufficient to raise the temperature of the reaction mixture by at least 30° C. within less than 90 minutes after the addition of nitric acid is complete; and
   the process further comprises, prior to separating the a aqueous suspension, cooling the reaction mixture to a temperature less than 100° C.

13. A process for production of iron oxide red pigments, the process comprising:
  i. production of an aqueous suspension of finely divided haematite according to the process of claim 1, and
  ii. reacting the aqueous suspension of finely divided haematite as nucleus with:
    an iron salt and an alkaline precipitate in the presence of oxygen-containing gases or
    an elemental iron, an iron salt and oxygen-containing gases to give haematite pigment suspension.

14. The process for the production of iron oxide red pigments according to claim 13, wherein, when the reaction of the aqueous suspension of finely divided haematite as nucleus with an iron salt in step ii) is carried out in the presence of metallic iron, metallic iron is used in step ii) in a concentration of 20 to 100 g/l based on the volume of the reaction mixture at the beginning of the reaction.

15. The process for the production of iron oxide red pigments according to claim 13, wherein:
  the aqueous suspension of finely divided haematite as nucleus is reacted with an iron salt and an alkaline precipitant in the presence of oxygen-containing gases, and
  the oxygen-containing gases are introduced into the reaction mixture in an amount of 1 to 30 liters per hour per liters of reaction volume (liters/hour/liters) for a time of 2 to 150 hours during heating up to the reaction temperature and/or during the reaction.

16. Finely divided haematite obtained by the process according to claim 1.

17. Iron oxide red pigment obtained according to the process of claim 13.

18. A process for the colouring of products of the paint, varnish, coatings, building material, plastics or paper industry, of foodstuffs, baking enamels or coil coating compositions, granulated sands, sand-lime bricks, enamels, ceramic glazes, asphalt or bark mulch or of products of the pharmaceutical industry, which process comprises:
  x. production of the finely divided haematite according to claim 1, and
  y. colouring products of the paint, varnish, coatings, building material, plastics or paper industry, of foodstuffs, baking enamels or coil coating compositions, granulated sands, sand-lime bricks, enamels, ceramic glazes, asphalt or bark mulch or of products of the pharmaceutical industry, by means of the finely divided haematite of step x).

19. The process according to claim 4, further comprising isolating the finely divided haematite from the aqueous suspension.

20. The process for the production of iron oxide red pigments according to claim 15, wherein the oxygen-containing gas is air.

* * * * *